Nov. 5, 1963 — L. C. CHOUINGS — 3,109,518
DISC BRAKES
Filed Sept. 8, 1961 — 3 Sheets-Sheet 1

Nov. 5, 1963  L. C. CHOUINGS  3,109,518
DISC BRAKES
Filed Sept. 8, 1961  3 Sheets-Sheet 2
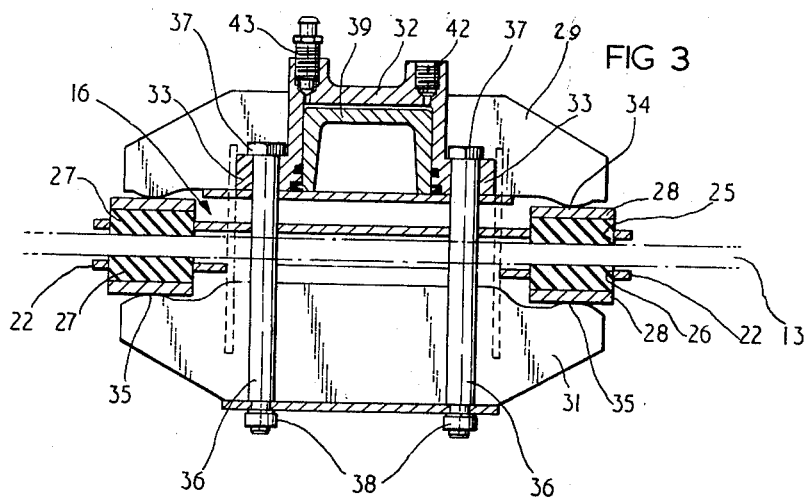
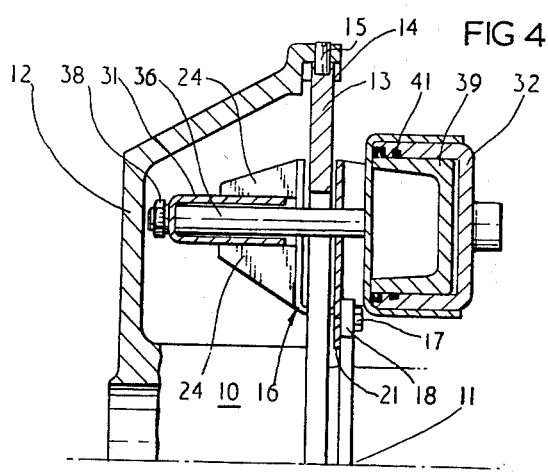

Nov. 5, 1963    L. C. CHOUINGS    3,109,518
DISC BRAKES

Filed Sept. 8, 1961    3 Sheets-Sheet 3

United States Patent Office 3,109,518
Patented Nov. 5, 1963

3,109,518
DISC BRAKES
Leslie Cyril Chouings, Leamington Spa, England, assignor to Automotive Products Company Limited, Leamington Spa, England
Filed Sept. 8, 1961, Ser. No. 136,869
Claims priority, application Great Britain Sept. 12, 1960
7 Claims. (Cl. 188—73)

This invention relates to disc brakes of the kind in which pads of friction material are pressed against opposite sides of a rotatable disc to provide frictional resistance to its rotation.

Disc brakes on motor vehicles are usually mounted inside the rims of the wheels, and their overall size is limited by the diameter of the wheel rims.

The object of the present invention is to provide a disc brake which, when associated with a wheel rim of a given size, has the areas of the disc surface which are engaged by the pads as close as is reasonably possible to the wheel rim, so that the effective radius at which the braking load is applied, and consequently the braking torque, are as large as possible.

According to the present invention, in a disc brake comprising a rotatable disc, pads of friction material adapted to engage opposite surfaces of said disc, and means for urging the said pads into engagement with the disc to effect braking, the disc is annular and is secured at its outer edge to the wheel or other rotatable member to be braked, the friction pads being arranged in two pairs each including a pad to engage one side of the disc and a pad substantially opposite thereto to engage the other side of the disc, two yoke members each acting on the outer sides of the pads on one side of the disc, and actuating means to urge the said yoke members towards each other so as to apply the pads to the disc, the actuating means being arranged on one side of the disc and being connected to the yoke member on the other side of the disc by a tension member or members passing through the central opening in the disc.

Preferably, the yoke members extend substantially along chords of the disc.

The actuating means may comprise a liquid pressure piston-and-cylinder device the cylinder of which is connected by pull rods to the yoke member on the opposite side of the disc whilst the piston acts on the yoke member on the same side of the disc as the said actuating means.

The friction pads are preferably slidably mounted in openings in a fixed carrier comprising side portions one on each side of the disc and a connecting portion extending through the central opening of the disc.

The invention is hereinafter described with reference to the accompanying drawings, in which:

FIGURE 3 is a section on the line III—III of FIGURE 1;

FIGURE 4 is a section on the line IV—IV of FIGURE 1; and

Figure 1:
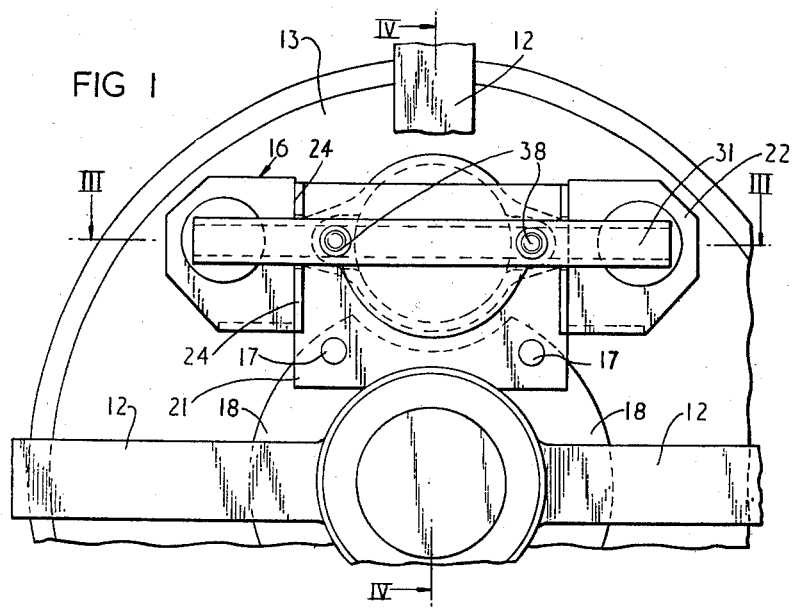
FIGURE 1 is a front view of one form of disc brake according to the invention.
Figure 2:
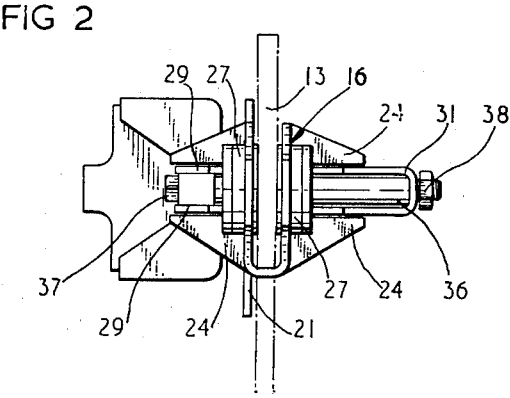
FIGURE 2 is an end view of the brake shown in FIGURE 1.

Referring to the drawings, a wheel hub 10 mounted on a stub axle 11 has integral with it spider arms 12 to which is secured an annular brake disc 13, the disc 13 being notched at its periphery to engage lugs 14 on the spider arms, and being held in position by set screws 15. The inner periphery of the brake disc 13 is therefore unobstructed.

A fixed carrier 16 for the pads which co-operate with the disc, and for the mechanism which applies the pads to the disc, is bolted at 17 to a flange 18 and the stub axle 11. The arrangement shown is suitable for a front wheel brake, and in a rear wheel brake the carrier 16 would be similarly bolted to a flange on the axle housing.

Figure 5:
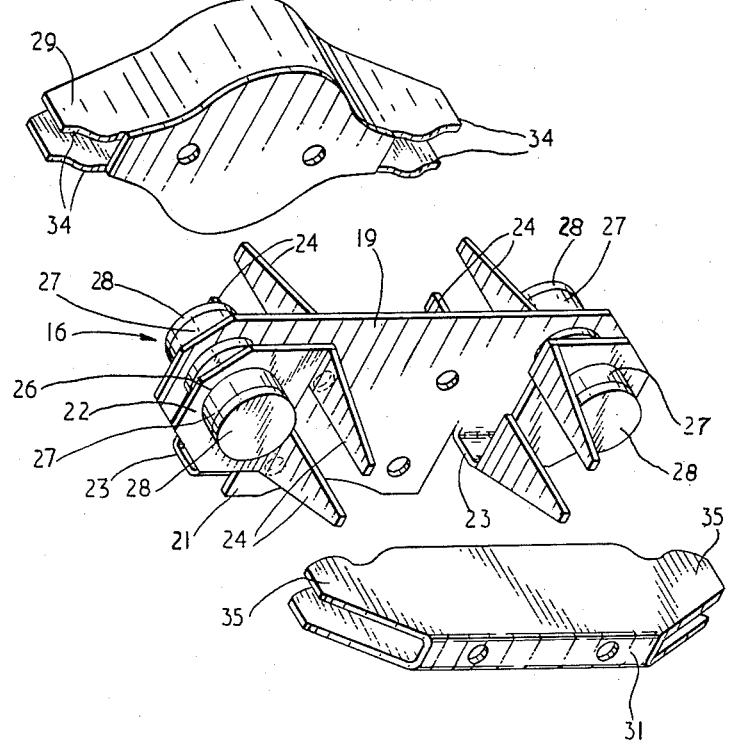
FIGURE 5 is an exploded perspective view of the main components of the brake.

The carrier 16, as shown in FIGURE 5, comprises a metal pressing consisting of an elongated flat portion 19 extending along a chord of the brake disc 13 and having a lateral extension 21 projecting radially inwardly of the disc for bolting to the flange 18, and two portions 22 each lying parallel to and spaced from one end of the portion 19, to which end portions they are connected, on the inner side of the carrier, by U-bends 23. To the side face of the portion 19 remote from the portions 22, and to the edges of the said portions 22 nearest the center of the carrier 16 are welded pairs of laterally outwardly extending projections 24.

The portion 19 of the carrier 16 lies on one side of the disc 13, and the portions 22 lie on the other side of the said disc. A circular hole 25 in each end of the portion 19, and a hole 26 co-axial therewith in the corresponding portion 22 provide guides for cylindrical friction pads 27 each of which has bonded to its outer face a metal disc 28.

Two elongated yoke members 29 and 31 are positioned one on each side of the carrier 16, each being slidable between the two pairs of projections 24 on that side of the carrier. The yoke member 29 is of U-shape in cross-section, the bend of the U being adjacent the carrier 16. This yoke member 29 is of greater width at its center than at its ends, the wider center portion accommodating a liquid pressure cylinder 32, open at its end facing the bend of the yoke member, and having a pair of laterally projecting ears 33 projecting towards the ends of the yoke member. The side walls of the yoke member are provided with projecting rounded edge portions 34 to engage with the discs 28 bonded to the brake pads 27 on that side of the brake disc.

The yoke member 31 is also U-shaped in cross-section but with the bend of the U on the side remote from the carrier, and is similarly formed with projecting rounded edge portions 35 to engage with the discs 28 bonded to the other two brake pads 27.

A pair of pull rods 36 extend through holes in the ears 33 on the cylinder 32, through holes in the bend of the yoke member 29 and in the portion 19 of the carrier 16, and through holes in the bend of the yoke member 31, the pull rods having heads 37 which engage the outer faces of the ears 33, and being screw-threaded at their other ends to receive nuts 38 which bear against the outer surface of the bend of the yoke member 31. A piston 39 in the cylinder 32 abuts against the bend of the yoke member 29, a fluid-tight joint between the cylinder and the piston being provided by a packing ring 41 mounted in a groove in the cylinder wall and engaging the piston. Liquid under pressure from a master cylinder or other liquid pressure producing device is admitted to the cylinder 32 through a connection at 42, and a bleed valve for releasing air from the cylinder is provided at 43.

The two pairs of friction pads 27 each lie opposite portions of the annular disc 13 at opposite ends of a chord of the said disc, and the pull rods 36 extend through the central opening in the said disc at points on the said chord.

Liquid under pressure acting in the cylinder 32 tends to move the cylinder 32 and the piston in opposite directions, the piston applying a thrust to the yoke member 29, and the cylinder applying a pull through the pull rods 36 to the yoke member 31, so that the friction pads are pressed simultaneously against opposite sides of the disc 13.

The braking torque is transmitted directly from the friction pads 27 to the carrier 16.

I claim:

1. A disc brake comprising an annular rotatable brake disc, a brake carrier member for applying a braking load to said brake disc including an elongated central portion extending parallel to a chord of said brake disc and having oppositely disposed end portions extending laterally from each side of the central portion, a radial portion extending laterally inwardly from the central portion for fixedly connecting the carrier to a stub axle to prevent rotation of it, said end portions having complementary end portions of substantially the same configuration disposed in spaced alignment therewith by web members formed integral with each of said end portions and its complementary end portion, said spaced aligned end portions providing a space through which said brake disc extends, a pair of axially extending spaced members provided on each end portion, each pair of spaced axial members extending in a direction away from the end portion to which they are joined, a first U-shape yoke member having its opposite ends slidably disposed between the axial members joined to the end portions adjacent said central portion, a second U-shape yoke member having its opposite ends slidably disposed between each pair of axial members joined to said complementary end portions, friction pad means carried by each end portion for engaging opposite sides of said brake disc, the opposite ends of said first and second yoke members being in alignment with said pad means for forcing them into contact with said brake disc, and an actuating means for said yoke members including hydraulic means disposed on one side of one of said yoke members and tension members operatively connected to said hydraulic means and yoke members to cause said yoke members to move toward each other to press said pad means against said brake disc.

2. A disc brake comprising an annular rotatable brake disc, a brake carrier member for applying a braking load to said brake disc including an elongated central portion extending parallel to a chord of said brake disc and having oppositely disposed end portions extending laterally from each side of the central portion, a radial portion extending laterally inwardly from the central portion for fixedly connecting the carrier to a stub axle to prevent rotation of it, said end portions having complementary end portions of substantially the same configuration disposed in spaced alignment therewith by web members formed integral with each of said end portions and its complementary end portion, said spaced aligned end portions providing a space through which said brake disc extends, a pair of axially extending spaced members provided on each end portion, each pair of spaced axial members extending in a direction away from the end portion to which they are joined, a first U-shape yoke member having its opposite ends slidably disposed between the axial members joined to the end portions adjacent said central portion, a second U-shape yoke member having its opposite ends slidably disposed between each pair of axial members joined to said complementary end portions, friction pad means carried by each end portion for engaging opposite sides of said brake disc, the opposite ends of said first and second yoke members being in alignment with said pad means for forcing them into contact with said brake disc, actuating means for said yoke members including spaced rod members extending parallel to said axial members and extending through said yoke members, a hydraulic cylinder slidably mounted on said rod members and disposed within said first yoke member between its opposite sides and opening toward the bight of this U-shape yoke member, a piston disposed in said cylinder and bearing against said bight of the yoke member, and means for supplying hydraulic fluid to said cylinder between said piston and the closed end of the cylinder to cause said yoke members to move toward each other so said pad means engage said brake disc.

3. The brake disc of claim 2 wherein said friction pad means are cylindrical and disposed in the end portions of said carrier member.

4. The brake disc of claim 3 wherein said rod members extend through the bight portions of both yoke members and are disposed inwardly of said axial members.

5. The brake disc of claim 4 wherein said axial members are disposed adjacent the inner ends of said end portions.

6. The brake disc of claim 5 wherein each pair of said axial members are disposed in vertical alignment with each other.

7. The brake disc of claim 6 wherein said friction pad members extend parallel to said axial members.

References Cited in the file of this patent

UNITED STATES PATENTS

| 2,804,176 | Trevaskis | Aug. 27, 1957 |
| 2,835,350 | Butler | May 20, 1958 |
| 2,924,302 | Black | Feb. 9, 1960 |
| 2,988,176 | Du Bois | June 13, 1961 |

FOREIGN PATENTS

| 1,126,226 | France | July 23, 1956 |